United States Patent
Nezami

(10) Patent No.: US 7,529,295 B1
(45) Date of Patent: May 5, 2009

(54) ACQUIRING FREQUENCY AND PHASE OFFSET ESTIMATES USING FREQUENCY DOMAIN ANALYSIS

(75) Inventor: Mohamed K. Nezami, South Pasadena, FL (US)

(73) Assignee: Raytheon Company, Waltham, MA (US)

( * ) Notice: Subject to any disclaimer, the term of this patent is extended or adjusted under 35 U.S.C. 154(b) by 774 days.

(21) Appl. No.: 10/816,741

(22) Filed: Apr. 2, 2004

(51) Int. Cl.
    *H04B 3/46* (2006.01)
(52) U.S. Cl. .................... 375/226; 375/224; 375/260; 375/324; 375/341; 375/371; 370/338; 370/404
(58) Field of Classification Search ............... 375/226, 375/208, 341, 329, 375, 324, 260, 136, 147, 375/267, 316, 327, 346, 371; 370/338, 404
See application file for complete search history.

(56) References Cited

U.S. PATENT DOCUMENTS

| 6,218,896 | B1 * | 4/2001 | Becker et al. ............... 329/304 |
| 6,499,008 | B2 * | 12/2002 | Miet ....................... 704/200.1 |
| 6,532,271 | B1 | 3/2003 | Hwang et al. .............. 375/326 |
| 6,757,344 | B2 * | 6/2004 | Carleton .................... 375/341 |
| 7,139,320 | B1 * | 11/2006 | Singh et al. ................. 375/260 |
| 7,180,960 | B2 * | 2/2007 | Sachse et al. ................ 375/308 |
| 7,184,506 | B2 * | 2/2007 | Kolze ........................ 375/371 |
| 7,369,633 | B2 * | 5/2008 | Jiang et al. .................. 375/354 |

| 2002/0118737 | A1 * | 8/2002 | Thesling et al. ............. 375/226 |
| 2003/0063583 | A1 * | 4/2003 | Padovani et al. ............ 370/329 |
| 2004/0086070 | A1 * | 5/2004 | Sachse et al. ................ 375/375 |
| 2004/0142660 | A1 * | 7/2004 | Churan ...................... 455/12.1 |
| 2004/0184551 | A1 * | 9/2004 | Liu et al. .................... 375/260 |

OTHER PUBLICATIONS

Luise, M. et al., "*Carrier Frequency Recovery in All-Digital Modems for Burst-Mode Transmissions*", IEEE Transactions on Communications, vol. 43, No. 2/3/4, © 1995 IEEE, pp. 1169-1178, Feb. 3-4, 1995.
De Gaudenzi, R., "*Performance Analysis of Decision-Directed Maximum-Likelihood Phase Estimators for M-PSK Modulated Signals*", IEEE Transactions on Communications, vol. 43, No. 12, © 1995 IEEE, pp. 3090-3100, Dec. 1995.
Mengali, U. et al., "*Data-Aided Frequency Estimation for Burst Digital Transmission*", IEEE Transactions on Communications, vol. 45, No. 1, © 1997 IEEE, pp. 23-25, Jan. 1997.
Morelli, M. et al., "*Feedforward Carrier Frequency Estimation with MSK-Type Signals*", IEEE Communications Letters, vol. 2, No. 8, © 1998 IEEE, pp. 235-237, Aug. 1998.

(Continued)

*Primary Examiner*—Shuwang Liu
*Assistant Examiner*—Hirdepal Singh
(74) *Attorney, Agent, or Firm*—Baker Botts L.L.P.

(57) ABSTRACT

Determining a frequency and phase offset estimates include receiving a signal at an offset estimator. The received signal is zero-padded in the time domain to yield a zero-padded signal. A Fourier transform of the zero-padded signal is taken to yield a transformed signal. The maximum power of the transformed signal is established. Frequency and phase offset estimates are generated based on the maximum power of the transformed signal.

18 Claims, 2 Drawing Sheets

OTHER PUBLICATIONS

So, H.C. et al., "*Comparison of Various Periodograms for Sinusoid Detection and Frequency Estimation*", IEEE Transactions on Aerospace and Electronic Systems, vol. 35, No. 3, © 1999 IEEE, pp. 945-952, Jul. 1999.

Lyons, R., "*How to Interpolate in the Time-Domain by Zero-Padding in the Frequency Domain*", lowegian's dspGuru™, http://www.dspguru.com/howto/tech/zeropad2.htm, © 1999, 4 pages.

Wang, Y. et al., "*Performance Analysis of a Class of Nondata-Aided Frequency Offset and Symbol Timing Estimators for Flat-Fading Channels*", IEEE Transactions on Signal Processing, vol. 50, No. 9, © 2002 IEEE, pp. 2295-2305, Sep. 2002.

Nezami, Mohamed K., "*Preamble-Less Carrier Phase Recovery in Rayleigh and Rician Channels*", © 2003, 5 pages.

\* cited by examiner

US 7,529,295 B1

ACQUIRING FREQUENCY AND PHASE OFFSET ESTIMATES USING FREQUENCY DOMAIN ANALYSIS

GOVERNMENT FUNDING

The U.S. Government may have certain rights in this invention as provided for by the terms of Grant Nos. MUOS G8238 TCCPM awarded by the U.S. Navy.

TECHNICAL FIELD

This invention relates generally to the field of signal processing and more specifically to acquiring frequency and phase offset estimates using frequency domain analysis.

BACKGROUND

Certain channel coding techniques allow wireless receivers to operate at lower signal-to-noise ratios than before. As a result, estimating carrier offsets to track signals is more challenging. Some known techniques use a preamble or amble to remove data modulation, then estimate frequency offsets using phase differentiation with respect to an elapsed time period. These techniques, however, typically increase noise, which reduces performance at low signal-to-noise ratios. Other known techniques rely on the use of lengthy continuous-wave (CW) or alternating sequence (AS) preambles. These techniques, however, typically result in spectral interference and are well known for their false acquisition.

SUMMARY OF THE DISCLOSURE

According to one embodiment of the present invention, determining a frequency and phase offsets estimate includes receiving a signal at an offset estimator. The received signal is zero-padded in the time domain to yield a zero-padded signal. A Fourier transform of the zero-padded signal is taken to yield a transformed signal. The maximum power of the transformed signal is established. A frequency offset estimate is generated based on the maximum power of the transformed signal. The frequency offset may be used to estimate a phase offset.

Certain embodiments of the invention may provide one or more technical advantages. A technical advantage of one embodiment may be that a frequency offset is estimated using frequency domain analysis. The embodiment does not require phase differentiation in the time domain analysis, which may increase noise. Another technical advantage of one embodiment may be that a short preamble may be used. The embodiment does not require lengthy continuos wave (CW) or alternating sequence (AS) preambles, which typically contribute to undesired spectral interference and result in false acquisition. Yet another technical advantage of one embodiment may be that a digital feed-forward (open loop) topology may be used. The topology may avoid problems associated with feedback methods that deteriorate when used in multipath wireless channels.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
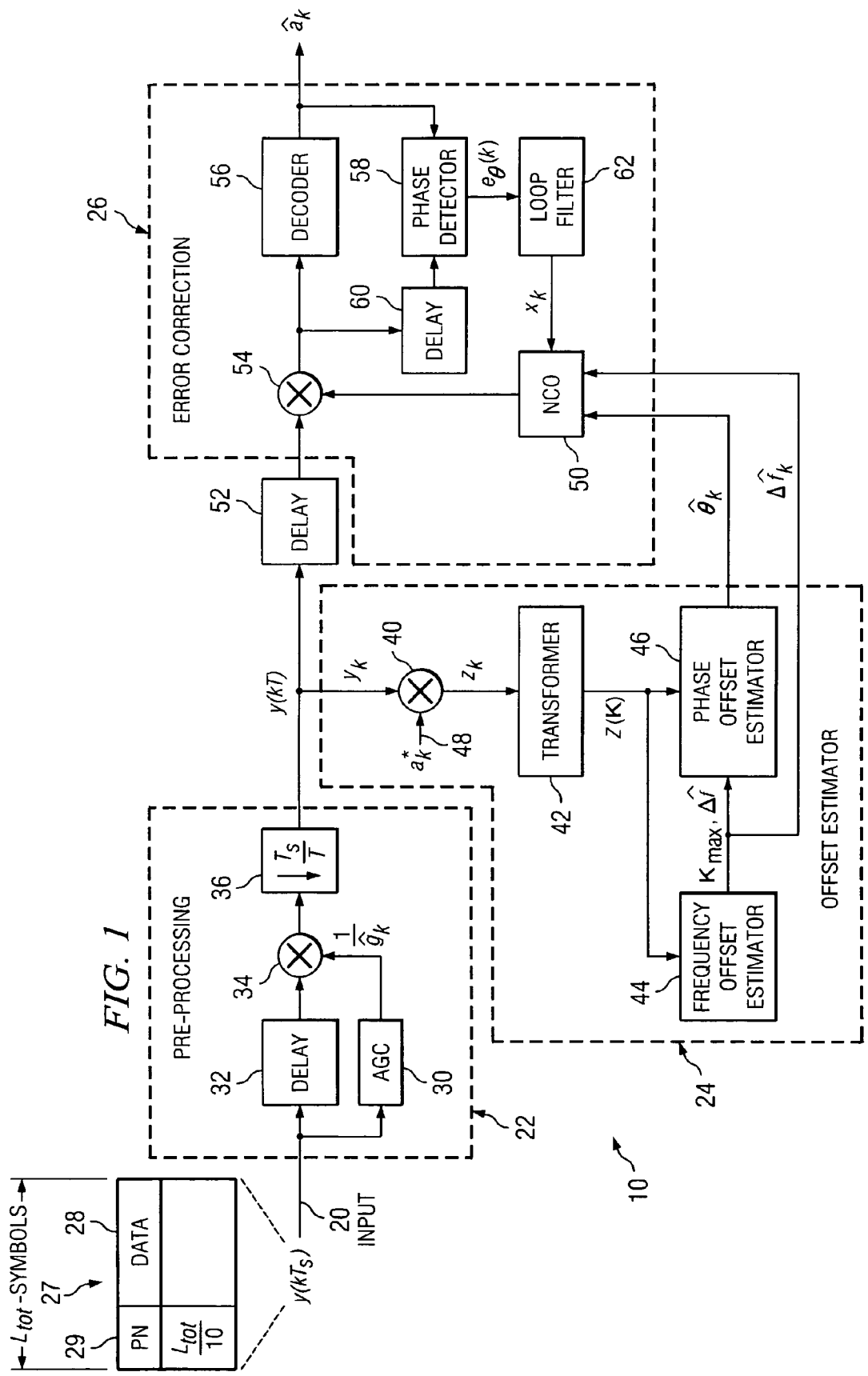
FIG. 1 is a block diagram illustrating one embodiment of a system for acquiring frequency and phase offsets.
Figure 2:
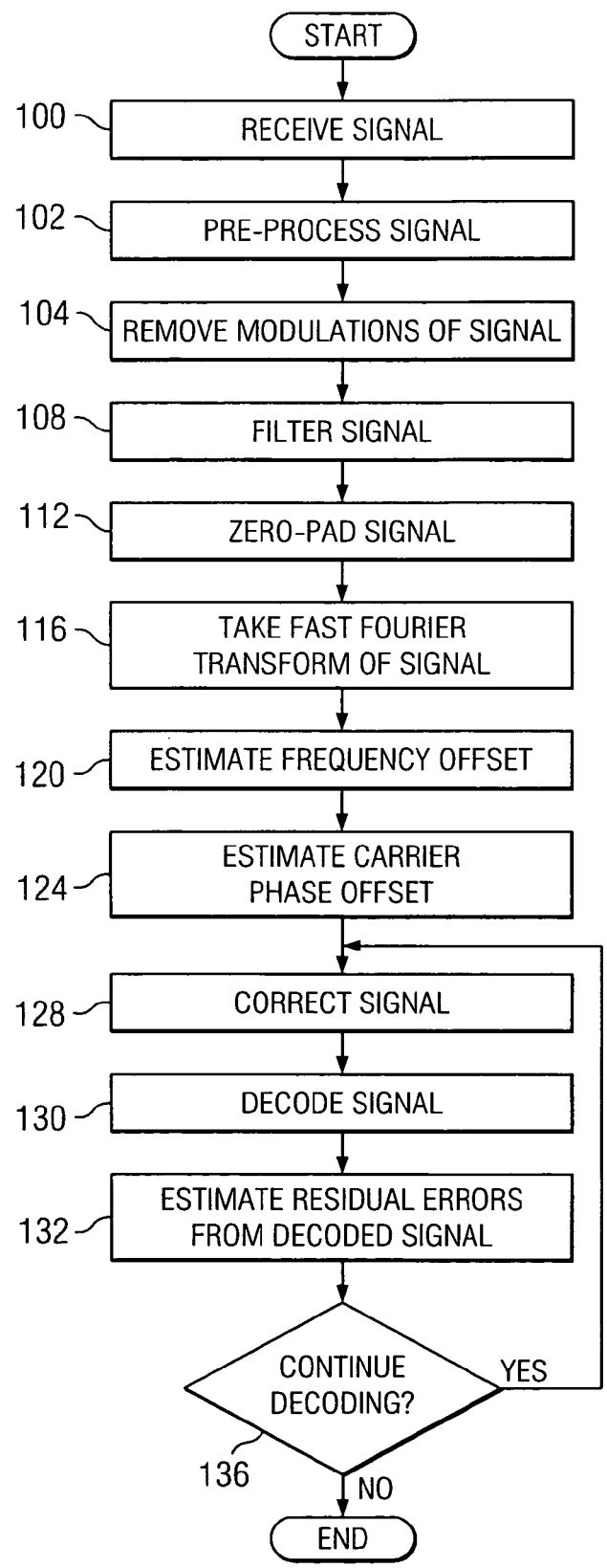
FIG. 2 is a flowchart illustrating one embodiment of a method for acquiring frequency and phase offsets that may be used with the system of FIG. 1.

Embodiments of the present invention and its advantages are best understood by referring to FIGS. 1 and 2 of the drawings, like numerals being used for like and corresponding parts of the various drawings.

FIG. 1 is a block diagram illustrating one embodiment of a system 10 for acquiring frequency and carrier phase offsets. System 10 may acquire frequency and carrier phase offsets of a modulated signal using frequency domain analysis applied to a data-aided technique. System 10 may track the signal using a decision-aided technique.

According to the illustrated embodiment, system 10 includes an input 20, one or more pre-processing modules 22, an offset estimator 24, and one or more error correction modules 26 coupled as shown. According to one embodiment of operation, input 20 receives a signal communicating symbols. Pre-processing modules 22 perform pre-processing operations on the received signal. Offset estimator 24 estimates a frequency offset and a carrier phase offset of the signal using frequency domain analysis. Error correction modules 26 estimate residual error and correct the received signal in accordance with the frequency offset estimate, the phase offset estimate, and the residual error estimate.

According to one embodiment, a signal may be received at a receiver antenna system. A radio frequency-to-intermediate frequency converter and an analog-to-digital converter may convert the signal. The converters may then feed a sampled digital signal to input 20.

A signal refers to an electrical quantity, such as a current or voltage, that may be used to convey symbols through a channel. A signal may comprise, for example, a coded signal. The signal may include packetized information. A packet 27 of the signal may have any suitable format and size. Data 28 of packet 27 may be preceded by a pseudo-noise (PN) code 29 that may be less than approximately 10% of the total packet length. PN code 29 may be known prior at the receiver, then exploited by offset estimator 24 using multiplier 40.

Pre-processing modules 22 perform pre-processing operations on the received signal such as removing channel gain from the signal, removing sample timing from the signal, decimating the signal, other suitable pre-processing operations, or any combination of the preceding. Pre-processing modules 22 of this embodiment include an automatic gain controller (AGC) 30, a delay 32, a multiplier 34, and a decimator 36 coupled as shown.

Automatic gain controller 30 estimates the channel gain of the received signal. Automatic gain controller 30 may comprise one or more detectors operable to maintain a constant amplitude of a signal by reducing or increasing the gain of the signal in accordance with the strength of the signal. Delay 32 delays the received signal for a suitable amount of time such that the signal and the channel gain estimate for the signal arrive at multiplier 34 at substantially the same time. Delay 32 may comprise a delay circuit, such as a first-in-first-out (FIFO) circuit that introduces a time delay. Multiplier 34 removes the channel gain from the received signal. Decimator 36 reduces the rate of the received signal.

Offset estimator 24 estimates a frequency offset, a carrier phase offset, or both a frequency offset and a carrier phase offset of the received signal using frequency domain analysis. A frequency offset refers to the difference between a transmitter frequency and a reference frequency, and a phase offset refers to the difference between the phase of the received signal and a reference phase, where the difference is typically introduced by the channel through which the received signal has passed. Offset estimator 24 includes a multiplier 40, a transformer 42, a frequency offset estimator 44, and a phase offset estimator 46 coupled as shown. Multiplier 40 removes the modulation of the received signal using a pseudo random code 48 to yield a signal with a residual tone that corresponds to the actual frequency offset.

Transformer 42 pads a predetermined window of time that is thought to include PN code 29 with zeros and then performs a Fourier transform on the zero-padded signal to yield a frequency transformed signal. Zero-padding refers to adding one or more zero-valued samples to a signal. Any suitable number of zero-valued samples may be added to any suitable portion of a signal, such as the beginning, middle, or both the beginning and middle of the signal. A Fourier transform may refer to a discrete Fourier transform, such as a fast Fourier transform, used for frequency analysis of discrete signals. Although transformer 42 is shown performing the zero-padding and the fast Fourier transform, any number of modules may perform these operations. Frequency offset estimator 44 estimates the frequency offset of the transformed signal, and provides the frequency offset estimate to phase offset estimator 46. Phase offset estimator 46 estimates the phase offset from the same transformed signal and the frequency offset estimate.

Error correction modules 26 estimate the residual error and correct the received signal for the frequency offset, the phase offset, and the residual error. Error correction modules 26 include a numerically controlled oscillator (NCO) 50, a multiplier 54, a data decoder 56, a phase detector 58, a delay 60, and a loop filter 62 coupled as shown. Error correction modules 26 are coupled to a delay 52 as shown.

Delay 52 delays the received signal for suitable amount of time such that the received signal and correction information from numerically controlled oscillator 50 arrive at multiplier 54 at substantially the same time. Delay 52 may comprise a delay circuit, such as a FIFO circuit that introduces a time delay. Multiplier 54 applies the correction information to the received signal to yield a corrected signal. Decoder 56 decodes the corrected signal to yield a decoded signal having the symbols of the received signal. Delay 60 delays the corrected signal by a single symbol period T such that the delayed signal and the decoded signal arrive at phase detector 58 at substantially the same time. Delay 60 may comprise a delay circuit, such as a FIFO circuit that introduces a time delay.

Phase detector 58, along with loop filter 62 and numerically controlled oscillator 50, form a phase-locked loop. Phase detector 58 compares the received delayed signal corrected using estimates from offset estimator 24 with the decoded symbols estimate residual error. Phase detector 58 may comprise a detector for phase modulation and frequency modulation, and may generate an estimate corresponding to the difference in phase between the signals. Loop filter 62 determines an error correction from the residual error estimate.

Numerically controlled oscillator 50 receives frequency offset estimates $\Delta f$, determines corrections in accordance with the estimates, and sends correction information to multiplier 54. For example, numerically controlled oscillator 50 receives the phase offset estimate from phase detector 58, determines phase offset corrections $\theta_k$ from estimator 24 and residual errors $\chi_k$ from the loop filter 62, and sends correction information to multiplier 54. Numerically controlled oscillator 50 may include one or more circuits operable to generate a digital oscillating signal. As described previously, multiplier 54 applies the correction information to the received signal.

System 10 may be used for wireless receivers that operate at a low signal-to-noise ratio. These wireless receivers may use any suitable channel coding technique, such as Reed-Solomon coding or turbo coding for constant envelope bandwidth efficient modulations such as continuous phase frequency shift keying (CPFSK).

Alterations or permutations such as modifications, additions, or omissions may be made to system 10 without departing from the scope of the invention. System 10 may have more, fewer, or other modules. Moreover, the operations of system 10 may be performed by more, fewer, or other modules. For example, the operations of transformer 42 may be performed by more than one module. Additionally, operations of system 10 may be performed using any suitable logic comprising software, hardware, other logic, or any suitable combination of the preceding. As used in this document, "each" refers to each member of a set or each member of a subset of a set.

FIG. 2 is a flowchart illustrating one embodiment of a method for acquiring frequency and carrier phase offsets that may be used with the system of FIG. 1. Although the method is described as used with system 10 of FIG. 1, the method may be performed using any suitable system for acquiring frequency and carrier phase offsets.

The method begins at step 100, where a signal is received. According to the illustrated embodiment, input 20 receives a signal that has traveled through a channel. A packet of the signal may have, for example, a preamble of L=50 symbols and a total coded packet size of $L_{tot}$=1024 symbols with Minimum Shift Keying (MSK) modulations. The preamble symbols $\{c_k^*\}$ may be less than approximately five or ten percent of the total packet size.

The signal is pre-processed at step 102. For example, the signal may be sampled by a receiver analog-to-digital (A/D) converter sampling at a rate of $1/T_s$, which is an integer multiple of the symbol rate 1/T. The sampled signal $y_k$=y(kT) may be given by Equation (1):

$$y_k = g_k a_k e^{-j(2\pi \Delta f (kT_s + \tau) + \theta_k)} + n_k \quad (1)$$

where k represents the sample $T_s$ index, $a_k$ represents the transmitted complex data symbol sample, $\Delta f$ represents the frequency offset, $g_k$ represents the channel gain magnitude sample, $\theta_k$ represents the phase shift introduced by the channel, $\tau$ represents the sample timing error, and $n_k$ represents the complex additive white Gaussian noise (AWGN).

According to the illustrated embodiment, automatic gain controller 30 estimates the channel gain $\hat{g}_k$. Multiplier 34 removes channel gain $g_k$ from signal $y(kT_s)$ delayed by delay 32. The sample timing may also be removed. To reduce computational complexity, decimator 36 may decimate signal $y(kT_s)$ to a single sample per symbol to yield signal y(kT).

The transmitted modulations of the signal are removed at step 104. The transmitted modulations for symbol sample $a_k$ may be removed by multiplying signal $y_k$ by a locally generated conjugate replica 48 of preamble symbols $\{c_k^*\}$, where * indicates a complex conjugate. According to the illustrated embodiment, multiplier 40 receives pseudo-random code $a_k^*$

48 and signal $y_k$ to yield unmodulated signal $z_k$. If the sample timing ($T_s-\tau$) is accurate, signal $z_k$ may be given by Equation (2):

$$z_k = y_k c_k^* = c_k^* a_k e^{j(2\pi\Delta fkT+\theta_k)} + n_k c_k^* \tag{2}$$

Since $c_k^* a_k = 1$, the baseband signal $z_k$ given by Equation (2) may also be described by Equation (2'):

$$z_k = e^{j(2\pi\Delta fkT+\theta_k)} + n_k c_k^* \tag{2'}$$

The signal is filtered at step 108 to pass through the maximum expected frequency offset. For example, a linear bandpass filter (BPF) may have a bandwidth that is only wide enough to pass through the maximum expected frequency offset $BW_{BPF} = \Delta f_{max}$. The filtering may reduce the probability of false frequency offset detection due to noise or spurious receiver emissions.

The signal is zero-padded at step 112. According to the illustrated embodiment, transformer 42 zero-pads signal $z_k$. Any suitable number of zero-valued samples may be added to the signal to zero-pad the signal in any suitable manner. According to one embodiment, to generate a fast Fourier transform of N samples for L symbols, N-L zero-valued complex samples may be appended. For example, to generate a fast Fourier transform of N=1024 samples for L=50 symbols, N-L=974 zero-valued complex samples may be appended.

A fast Fourier transform (FFT) of the signal is taken at step 116. According to the illustrated embodiment, transformer 42 takes a fast Fourier transform of signal $z_k$. The resulting transformed signal may be described by Equation (3):

$$Z(K) = \sum_{k=0}^{N-1} (e^{j(2\pi\Delta fkT+\theta_k)} + n_k c_k^*) e^{-j2\pi\frac{k}{N}k} \tag{3}$$

where k represents the frequency bin index, $k=f_s/N$ represents the FFT bin resolution, and $f_s$ represents the sampling frequency, which in this case is equal to the symbol rate (1/T). Any suitable number N of FFT bins may be used, for example, N=1024, where k ranges from k=0 to k=N-1. The N bins may include a single bin with maximum energy $k=k_{max}$, which corresponds to the frequency offset max estimate $\Delta f$. Because a finite number of bins are used, the actual frequency offset $\Delta f$ may not coincide with the a bin, but may spread over multiple bins including $k=k_{max}$.

The frequency offset is estimated at step 120. According to the illustrated embodiment, frequency offset estimator 44 determines frequency offset estimate $\Delta \hat{f}$ by locating the FFT bin corresponding to the maximum power. Frequency offset estimate $\Delta \hat{f}$ may be given by Equation (4):

$$\Delta \hat{f} = \max_{\Delta f} |Z(K)| \tag{4}$$

Using the estimate obtained by Equation (4), the carrier phase offset is estimated at step 124. According to the illustrated embodiment, phase offset estimator 46 determines carrier phase offset estimate $\hat{\theta}_k$ according to Equation (5):

$$\hat{\theta}_k = \arg(Z(K_{max})) - 2\pi\Delta fT \tag{5}$$

where arg(x) represents the argument of complex value x computed using the arctangent function, $K_{max}$ is the index of the FFT bin corresponding to the maximum power, and k in this case refers back to the symbol index. The disturbance terms in Equations (4) and (5) may be determined by expanding Equation (3) as Equation (3'):

$$Z(K) = \sum_{k=0}^{N-1} e^{j(2\pi\Delta fkT+\theta_k-2\pi\frac{k}{N}k)} + \underbrace{\sum_{k=0}^{N-1} n_k c_k^* e^{-j2\pi\frac{k}{N}k}}_{disturbance} \tag{3'}$$

The offset estimates based on Equations (4) and (5) may have fewer disturbance terms than estimates obtained using conventional data-aided methods. Moreover, the zero-padding performed at step 112 may improve offset estimates by averaging the estimates over a longer interval N than the interval used in conventional data-aided methods.

The signal is corrected at step 128. According to the illustrated embodiment, numerically controlled oscillator (NCO) 50 receives offset estimates from offset estimator 24 and a residual error correction from loop filter 62. Numerically controlled oscillator 50 sends correction information to multiplier 54 to correct the offsets and residual error of signal $Y_k$ delayed by delay 52 to yield signal $y_k$ given by Equation (6):

$$y_k = a_k e^{j(\delta\theta_k+2\pi k\delta f(T+\delta\tau))} + n_k \tag{6}$$

where $n_k$ is the resulting additive white Gaussian noise AWGN, k represents the symbol index, $\delta\tau$ represents any timing residual error, $\delta f$ represents the frequency offset residual error, and $\delta\theta$ represents the carrier phase offset residual error. The frequency offset residual error and the carrier phase offset residual error result from inaccuracies of offset estimators 44 and 46. The signal is decoded at step 130. According to the illustrated embodiment, decoder 56 decodes the signal to yield symbols $\hat{a}_k$.

The residual error is estimated from the decoded signal at step 132. The carrier recovery parameters based on Equations (4) and (5) may have some residual errors due to FFT bin resolution. The undesired phase rotation error $e^{j(\delta\theta_k+2\pi k\delta f(T+\delta\tau))}$ may be removed using decision-aided tracking methods. If the network timing is accurate, the timing residual error $\delta\tau$ may be assumed to be negligible, and so only the error offset term $e^{j(\delta\theta_k+2\pi k\delta fT)}$ is tracked and removed. According to the illustrated embodiment, phase detector 58 obtains an error $e_\theta(k)$ by multiplying the conjugated symbol $\hat{a}_k^*$ from decoder 54 and its corresponding input sample $a_k e^{j(\delta\theta_k+2\pi\delta fkT)} + n_k$ stored in delay 60, and then taking the imaginary part of the result, yielding error signal $e_\theta(k)$ given by Equation (7):

$$e_\theta(k) = Im\{\hat{a}_k^* a_k e^{j(\delta\theta_k 2\pi\delta fkT)} + n_k \hat{a}_k^*\} \tag{7}$$

Assuming that the transmitted symbols are designed such that $|\hat{a}_k^*||a_k|=1$, and ignoring the noise contribution by the term $n_k \hat{a}_k^*$, the error signal $e_\theta(k)$ may approximated using small angle approximation by Equation (8):

$$e_\theta(k) = \delta\theta_k + 2\pi\delta fkT \tag{8}$$

where k is the symbol index.

Loop filter 62 and numerically controlled oscillator 50 operate on error signal $e_\theta(k)$ to form a phase locked loop (PLL) that is used to track the final carrier offsets. Loop filter 62 calculates a signal given by Equation (9):

$$x_k = x_{k-1} + K_p e_\theta(k) + K_i e_\theta(k-1) \tag{9}$$

where the constants $K_p$ and $K_i$ represent the proportional and integrator loop coefficients, respectively. The error signal described by Equation (9) is then sent to numerically controlled oscillator 50, which uses the error signal to correct the signal using multiplier 54.

Depending on the desired tracking loop dynamics, the maximum frequency residual error $\delta f_{max}$ in Equation (7) that the loop can cope with is bounded by $\delta f_{max} \leq B_L$, where $B_L$ is the tracking loop bandwidth that is largely dependent on $K_p$ and $K_i$ in Equation (9). The value of $\delta f_{max}$ may be used to determine the value of N of Equation (4).

If decoding is to continue at step 136, the method returns to step 128 to correct the signal. If decoding is not to continue at step 136, the method terminates.

According to one example, for a packet size of 1,024 Minimum-Shift Keying symbols, the method may achieve a perfect carrier offset estimation at $E_s/N_o = -2$ dB, where $E_s/N_o$ represents the ratio of energy per symbol over the noise within one symbol duration, while using only 50 Minimum-Shift Keying PN symbols. Such performance may be suitable for receivers that are required to receive turbo coded satellite signals or land based long-range line-of-sight communication networks requiring at least $E_s/N_o = 2$ dB for bit-error rate of $10^{-5}$.

Alterations or permutations such as modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a frequency offset is estimated using frequency domain analysis. The embodiment does not require phase differentiation time domain analysis, which may increase noise. Another technical advantage of one embodiment may be that a short preamble may be used. The embodiment does not require lengthy continues wave (CW) or alternating sequence (AS) preambles, which typically contribute to undesired spectral interference and result in false acquisition. Yet another technical advantage of one embodiment may be that a digital feed-forward (open loop) topology may be used. The topology may avoid problems associated with feedback methods that deteriorate when used in multipath wireless channels.

While this disclosure has been described in terms of certain embodiments and generally associated methods, alterations and permutations of the embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for determining a frequency offset estimate, comprising:
   receiving a signal at an offset estimator, the signal conveying a plurality of symbols in a plurality of packets, a packet having a preamble comprising a plurality of preamble symbols;
   zero-padding the received signal in a time domain of the received signal with a plurality of zero-valued samples to yield a zero-padded signal, a number of the zero-valued samples calculated from a difference between a number of a plurality of Fourier transform bins and a number of the preamble symbols;
   taking a Fourier transform of the zero-padded signal using the Fourier transform bins to yield a transformed signal;
   establishing a maximum power of the transformed signal;
   generating a frequency offset estimate based on the maximum power of the transformed signal;
   receiving the frequency offset estimate at a numerically controlled oscillator;
   receiving a phase offset estimate at the numerically controlled oscillator;
   receiving a residual error correction at the numerically controlled oscillator; and
   adjusting the received signal in accordance with the frequency offset estimate, the phase offset estimate, and the residual error correction.

2. The method of claim 1, wherein generating the frequency offset estimate based on the maximum power of the transformed signal further comprises generating the frequency offset estimate as being substantially equivalent to the maximum power of the transformed signal.

3. The method of claim 1, further comprising converting the received signal to a baseband frequency using the preamble, the preamble comprising less than ten percent of the packet.

4. The method of claim 1, wherein establishing the maximum power of the transformed signal further comprises locating a Fourier transform bin corresponding to the maximum power.

5. The method of claim 1, further comprising determining a phase offset estimate from a fast Fourier transform bin corresponding to the maximum power.

6. The method of claim 1, further comprising:
   generating a decoded signal from the received signal;
   comparing the received signal with the decoded signal; and
   determining a residual error estimate in accordance with the comparison.

7. The method of claim 1, further comprising adjusting the received signal in accordance with at least one of the frequency offset estimate, a phase offset estimate, and a residual error estimate.

8. The method of claim 1, further comprising:
   adjusting the received signal in accordance with at least one of the frequency offset estimate, a phase offset estimate, and a residual error estimate to yield a corrected signal; and
   decoding the corrected signal to yield the plurality of symbols.

9. A system for determining a frequency offset estimate, comprising:
   an input operable to receive a signal at an offset estimator, the signal conveying a plurality of symbols in a plurality of packets, a packet having a preamble comprising a plurality of preamble symbols;
   a transformer coupled to the input and operable to:
      zero-pad the received signal in a time domain of the received signal with a plurality of zero-valued samples to yield a zero-padded signal, a number of the zero-valued samples calculated from a difference between a number of a plurality of Fourier transform bins and a number of the preamble symbols; and
      take a Fourier transform of the zero-padded signal using the Fourier transform bins to yield a transformed signal; and
   a frequency offset estimator coupled to the transformer and operable to:
      establish a maximum power of the transformed signal;
      generate a frequency offset estimate based on the maximum power of the transformed signal; and
   a numerically controlled oscillator operable to:
      receive the frequency offset estimate;

receive a phase offset estimate;
receive a residual error correction; and
adjust the received signal in accordance with the frequency offset estimate, the phase offset estimate, and the residual error correction.

10. The system of claim 9, the frequency offset estimator further operable to generate the frequency offset estimate based on the maximum power of the transformed signal by generating the frequency offset estimate as being substantially equivalent to the maximum power of the transformed signal.

11. The system of claim 9, further comprising one or more pre-processing modules operable to convert the received signal to a baseband frequency using the preamble, the preamble comprising less than ten percent of the packet.

12. The system of claim 9, the frequency offset estimator further operable to establish the maximum power of the transformed signal by locating a Fourier transform bin corresponding to the maximum power.

13. The system of claim 9, further comprising determining a phase offset estimate from a fast Fourier transform bin corresponding to the maximum power.

14. The system of claim 9, further comprising one or more error correction modules operable to:
generate a decoded signal from the received signal;
compare the received signal with the decoded signal; and
determine a residual error estimate in accordance with the comparison.

15. The system of claim 9, further comprising one or more error correction modules operable to adjust the received signal in accordance with at least one of the frequency offset estimate, a phase offset estimate, and a residual error estimate.

16. The system of claim 9, further comprising one or more error correction modules operable to:
adjust the received signal in accordance with at least one of the frequency offset estimate, a phase offset estimate, and a residual error estimate to yield a corrected signal; and
decode the corrected signal to yield the plurality of symbols.

17. A system for determining a frequency offset estimate, comprising:
means for receiving a signal at an offset estimator, the signal conveying a plurality of symbols in a plurality of packets, a packet having a preamble comprising a plurality of preamble symbols;
means for zero-padding the received signal in a time domain of the received signal with a plurality of zero-valued samples to yield a zero-padded signal, a number of the zero-valued samples calculated from a difference between a number of a plurality of Fourier transform bins and a number of the preamble symbols;
means for taking a Fourier transform of the zero-padded signal using the Fourier transform bins to yield a transformed signal;
means for establishing a maximum power of the transformed signal; and
means for generating a frequency offset estimate based on the maximum power of the transformed signal;
means for receiving the frequency offset estimate at a numerically controlled oscillator;
means for receiving a phase offset estimate at the numerically controlled oscillator;
means for receiving a residual error correction at the numerically controlled oscillator; and
means for adjusting the received signal in accordance with the frequency offset estimate, the phase offset estimate and the residual error correction.

18. A method for determining a frequency offset estimate, comprising:
receiving a signal at an offset estimator, the signal conveying a plurality of symbols in a plurality of packets, a packet having a preamble comprising a plurality of preamble symbols;
converting the received signal to a baseband frequency using the preamble, the preamble comprising less than ten percent of the packet size of the packet;
zero-padding the received signal in a time domain of the received signal with a plurality of zero-valued samples to yield a zero-padded signal, a number of the zero-valued samples calculated from a difference between a number of a plurality of Fourier transform bins and a number of the preamble symbols;
taking a Fourier transform of the zero-padded signal using the Fourier transform bins to yield a transformed signal;
establishing a maximum power of the transformed signal by locating a Fourier transform bin corresponding to the maximum power;
generating a frequency offset estimate from the maximum power of the transformed signal;
generating a phase offset estimate from the maximum power of the transformed signal;
generating a decoded signal from the received signal;
comparing the received signal with the decoded signal; and
determining a residual error estimate in accordance with the comparison;
receiving the frequency offset estimate at a numerically controlled oscillator;
receiving the phase offset estimate at the numerically controlled oscillator;
receiving the residual error correction at the numerically controlled oscillator; and
adjusting the received signal in accordance with the frequency offset estimate, the phase offset estimate, and the residual error correction; and
decoding the corrected signal to yield the plurality of symbols.

* * * * *